United States Patent [19]
Lippold et al.

[11] Patent Number: 6,155,517
[45] Date of Patent: *Dec. 5, 2000

[54] PAPER ROLL DRIVE

[75] Inventors: Steven R. Lippold, Oakfield; Alex B. Vayntrub, Rochester, both of N.Y.

[73] Assignee: Eastman Kodak Company, Rochester, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 09/070,212

[22] Filed: Apr. 30, 1998

[51] Int. Cl.[7] .......................... B65H 75/24; G03D 13/14
[52] U.S. Cl. .................................... 242/571.5; 242/573.1; 242/573.9; 396/648
[58] Field of Search .............................. 242/571.5, 573.1, 242/573.9; 269/48.3, 48.4; 396/648

[56] References Cited

U.S. PATENT DOCUMENTS

| | | |
|---|---|---|
| 509,160 | 11/1893 | Giles . |
| 1,673,878 | 6/1928 | Leopold, Jr. . |
| 1,988,129 | 1/1935 | Martin . |
| 2,134,043 | 10/1938 | Hoppe et al. . |
| 2,345,246 | 3/1944 | Elke ........................................ 242/573.9 |
| 2,443,243 | 6/1948 | Hayssen . |
| 2,851,227 | 9/1958 | Bergelson . |
| 2,952,418 | 9/1960 | Rice ........................................ 242/573.9 |
| 3,052,420 | 9/1962 | Roberts . |
| 3,610,643 | 10/1971 | Thompson . |
| 3,791,659 | 2/1974 | Hardin ................................... 242/573.9 |
| 3,840,195 | 10/1974 | Zebny . |
| 4,354,644 | 10/1982 | Grant ..................................... 242/573.9 |
| 4,795,106 | 1/1989 | Weiss et al. . |

OTHER PUBLICATIONS

Noritsu Koki Co., Ltd. "QSS–2102 Operator's Manual (Basic Operations)." "For System 1 Ver.b, System 2 Ver.b", Sep. 8, 1995. pp. 3–25 to 3–29.

Exploded parts view "Quick Service System Parts List, Printer–Processor". Model QSS–2102 (Noritsu).

*Primary Examiner*—John Q. Nguyen
*Attorney, Agent, or Firm*—David A. Novais

[57] ABSTRACT

An intercore for mounting a hollow photographic web roll core and to transmit rotation from an elongated spindle to the core, which spindle has one or more axially extending ramps which slope radially outward in a direction away from a front end. The intercore includes a bore to removably receive the spindle by insertion of the spindle front end first into the bore. At least one slot is present in the intercore, carrying a lug which can move radially within the slot and which is positioned such that insertion of the spindle front end first into the bore causes each lug to ride on a corresponding ramp and be urged radially outward through its carrying slot and into engagement with a hollow core positioned over the intercore. An elongated spindle is provided in another aspect, for insertion into a bore of an intercore which mounts a hollow photographic web roll core for rotation. The spindle has a front end, a rear end adapted to be rotationally driven, and one or more axially extending ramps which slope radially outward in a direction away from the front end. A drive assembly can use the intercore and the spindle together.

15 Claims, 8 Drawing Sheets

PAPER ROLL DRIVE

FIELD OF THE INVENTION

This invention relates to holding different lengths of photographic web rolls in particular, for rotation.

BACKGROUND OF THE INVENTION

In photofinishing, customer images are printed onto a photographic paper. Conventionally this printing has been optical, using a light source which has passed through a negative to be printed to expose the paper. More recently, it has been suggested that the exposure can be from a digitally captured image, using a CRT, laser or light emitting diode printer. At wholesale photofinishing laboratories, where large numbers of images must be printed in a short time, the paper is normally supplied from a web in the form of a roll mounted within a paper dispensing cassette in a known manner. The paper cassette is light tight when closed for transport to and from the printer, and is typically loaded in a dark room to avoid undesirable fogging of the photographic paper. Photographic paper rolls are typically mounted on cardboard cores which in turn are mounted on an intercore dimensioned to fit on a spindle which is driven by the printer. Rotation of the spindle can control dispensing and uptake of a paper roll. Following exposure, the web is chemically developed in a known manner and then cut to yield paper prints of many individual images which are then supplied to respective customers.

During the printing process, it is necessary to correctly advance paper through the printer such that the paper position at the printing gate is precisely controlled. This is true of optical printers to avoid wasting paper by controlling the spacing between successive prints. However, in digital printers where printing may occur one line at a time (such as by a laser), control of paper dispensing and uptake by precisely controlling cassette spindle rotation, can become even more important. Thus, rotational slippage of a paper roll core on the intercore on which it is mounted, or slippage of the intercore on the spindle on which it is mounted, is very undesirable. To position and hold a paper roll within the cassette, the conventional approach has been to provide an intercore with flanges spaced apart on a hollow shaft a distance corresponding to the width of the roll which it is intended to mount. One or more flanges are removable to permit mounting of the roll. A tight frictional fit between the intercore shaft has typically been relied upon to ensure the paper roll is driven by the spindle on which it is mounted. This creates a problem in that paper cassettes are typically loaded in a darkroom. To attempt to fit a paper roll core onto a tightly fitting intercore shaft in such an environment can be a difficult exercise. Furthermore, even when mounted, under high loads frictional engagement between the intercore shaft and the cardboard core is always a possibility.

It would be desirable then to provide some way in which a photographic paper roll can be readily mounted on an intercore in a darkroom environment without trying to force the paper roll core onto a tightly fitting intercore shaft. It would also be desirable if some means were provided for maintaining good engagement between a core and the intercore.

SUMMARY OF THE INVENTION

The present invention then, provides an intercore for mounting a hollow paper roll core and to transmit rotation from an elongated spindle to the mounted core. The spindle with which the intercore is used, has one or more axially extending ramps which slope radially outward in a direction away from a front end. The intercore itself comprises a bore to reversibly receive the spindle by insertion of the spindle front end first into the bore. The intercore further has at least one slot carrying a lug which can move radially within the slot. The slot and lug are positioned such that insertion of the spindle front end first into the bore causes each lug to ride on a corresponding ramp and be urged radially outward through its carrying slot and into engagement with a hollow core positioned over the intercore.

In one aspect, there are a plurality of slots carrying respective lugs, spaced radially around the intercore. In this aspect, the drive assembly additionally may include a lug retainer extending around the intercore and interconnecting the lugs, to limit radial outward movement of the lugs. This lug retainer may be a resilient wire member and may ride within a radially extending slot within which each lug.

In another aspect of the invention, there is provided an elongated spindle for insertion into a bore of an intercore which mounts a hollow core for rotation. The spindle has a front end and an opposite rear end adapted to be rotationally driven. The spindle also has one or more axially extending ramps which slope radially outward in a direction away from the front end. Opposing walls may be provided, which extend alongside each ramp to restrain rotational movement of the lugs when the spindle is in a fully inserted position within the bore. In one particular aspect, forward sections of opposing walls of a corresponding ramp converge in a direction toward the rear end of the spindle, so as to guide corresponding lugs onto the ramps during insertion of the spindle into the intercore.

The present invention further provides a drive assembly for mounting and rotating a hollow core, which drive assembly includes a spindle and an intercore, such as those described above.

A drive assembly of the present invention allows for ready mounting and removal of cores on the intercore, even in a darkroom, while positively rotationally linking the spindle to the intercore and core so that rotational slippage between any of them is unlikely.

BRIEF DESCRIPTION OF THE DRAWINGS

Embodiments of the invention will now be described with reference to the drawings, in which.

DETAILED DESCRIPTION OF THE INVENTION

It will be understood in the present application that reference to front, forward, rear, rearward, upward and the like, are used in a relative sense only. Similarly, words such as "inserted into" are used in a relative sense only to indicate relative motions of parts (for example, reference to a spindle being "inserted into" an intercore, includes the motion of actually moving an intercore onto a stationary spindle).

Figure 1:
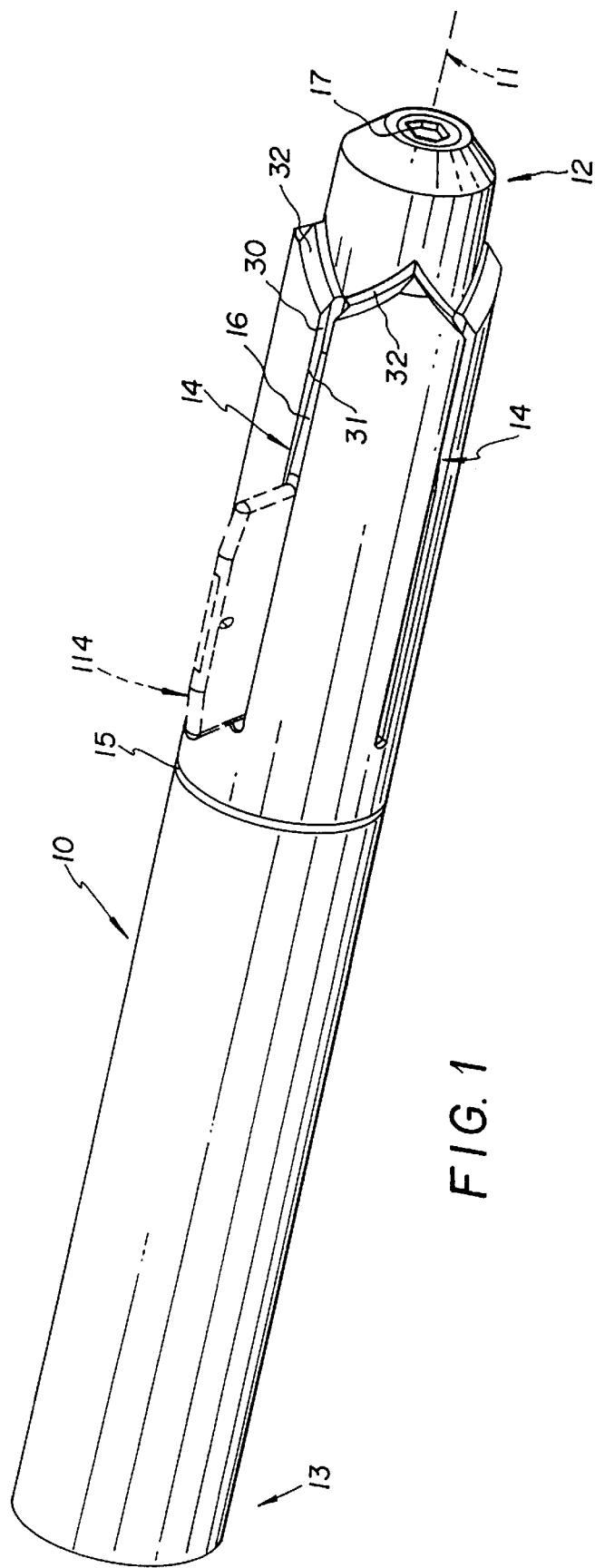
FIG. 1 is a perspective view of a spindle of the present invention, showing a drive lug in broken lines in a position when the spindle is fully inserted into an intercore.
Figure 3:
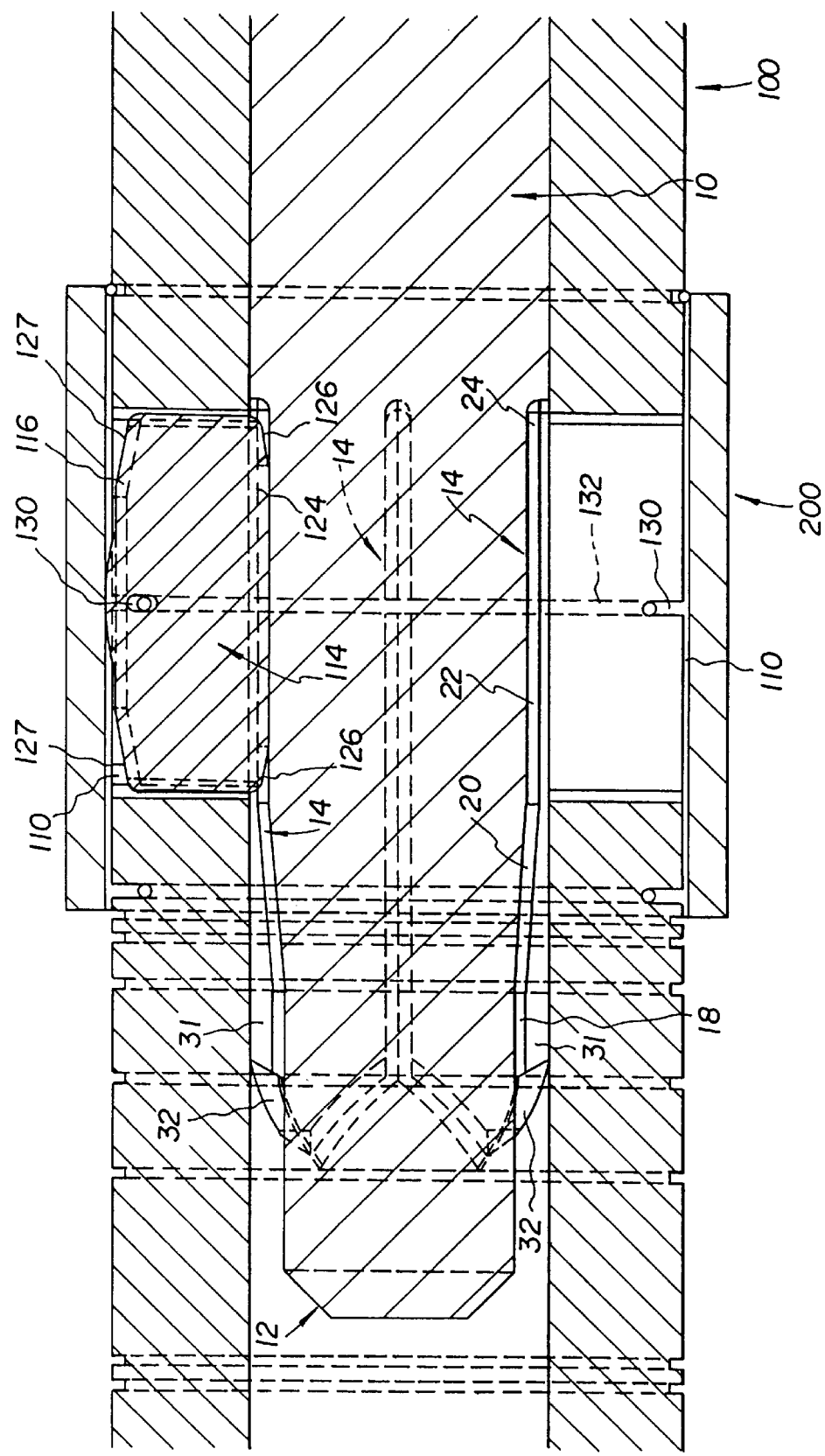
FIG. 3 is a cross-section along the axis of the intercore of FIG. 2.
Figure 4:
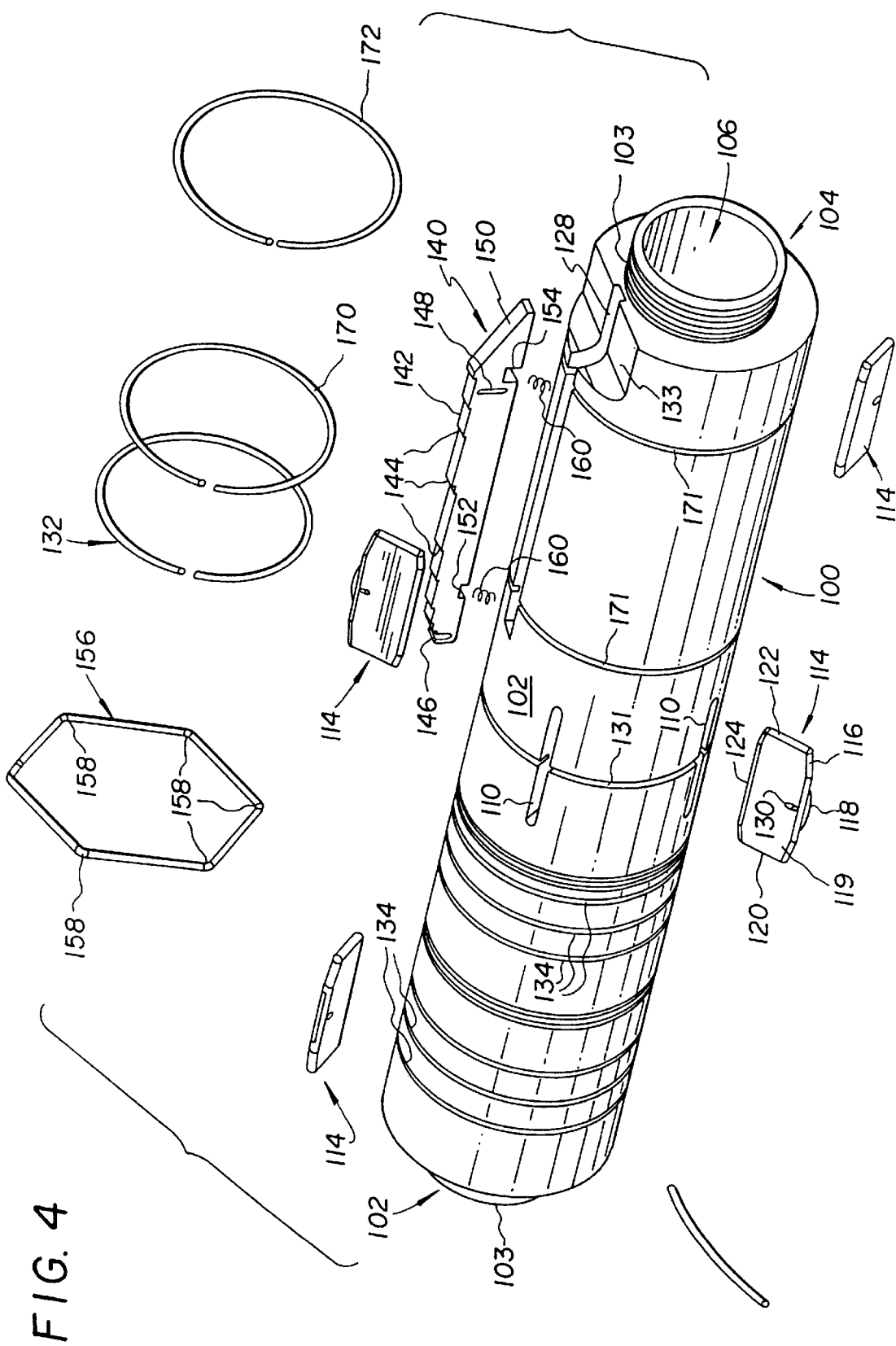
FIG. 4 is an exploded view of the intercore of FIG. 2.

Referring now to the drawings, the illustrated spindle and intercore of the present invention, and their use, will now be described. The elongated spindle 10 shown (best seen in FIG. 1) has a front end 12 and rear end 13. Rear end 13 is adapted for being driven rotationally in that it is in fact, the shaft of an electric drive motor (not shown). Front end 12 is provided with four axially extending slots 14 spaced equally about the axis 11 of spindle 10. Bottom surfaces of slots 14 define ramps 16 which slope radially outward (that is away from the axis 11 of spindle 10) in a rearward direction (that is, the ramps 16 become "higher" moving toward rear end 13 of spindle 10). Each ramp 16 includes a forward portion 18 and a rearward portion 22 (FIG. 3), both of which are substantially flat (that is, they do not slope outward, but are parallel to spindle axis 11), interconnected by an outwardly sloping portion 20. Opposing walls 30 of each slot 14 define walls which extend alongside each ramp 16. Each set of opposing walls 30 have rearward sections 31 which are essentially parallel, and have forward sections 32 which on each set converge in a rearward direction.

The drive assembly further includes an elongated intercore 100, best seen in FIGS. 2–5. Intercore 100 has a front end 103 and a rear end 104, and a bore 106 extending through intercore 100. Four identical slots 110 are spaced equally about intercore 100 and communicate between an outer surface 102 of intercore 100 and bore 106. Slots 110, located at a middle position along the length of intercore 100, carry respective identical lugs 114, each of which can slide radially within the corresponding slot 110. Each lug 114 is axially elongated and is plate like, and has an upper margin 116 (with upwardly sloping portions at either end), straight front margin 120, straight rear margin 122, and straight bottom margin 124. Top margin 116 and bottom margin 124 are interconnected to both front and rear margins 120, 122 by chamfered (that is, curved) corners 126, 127. Upper margin 116 includes in its middle, a radially outwardly convex blade portion 118 which is also narrower in width (that is, in a transverse direction as measured relative to the axis of intercore 100) than the remainder of lug 114 (defined substantially by main body portion 119 of lug 114). A middle of blade portion 118 defines a peak position of each lug 114. Each lug 114 further includes a radially outwardly extending slot 130 which is closed at both ends. A groove 131 extends about the middle of intercore 100 and positions a resilient open-ended lug retainer ring 132 in the form of a spring like metal. Retainer ring 132 extends around the intercore within groove 131 and through slots 130 on the four lugs 114. In this manner retainer ring 132 interconnects lugs 114 and limits their radial outward and radial inward movement within respective slots 110. However, groove 131 and slots 130 are deep enough, such that lugs 114 can slide within respective slots 110 between a retracted position in which blades 118 are below the outer surface 102, and an extended position in which blades 118 extend above outer surface 102.

Figure 2:
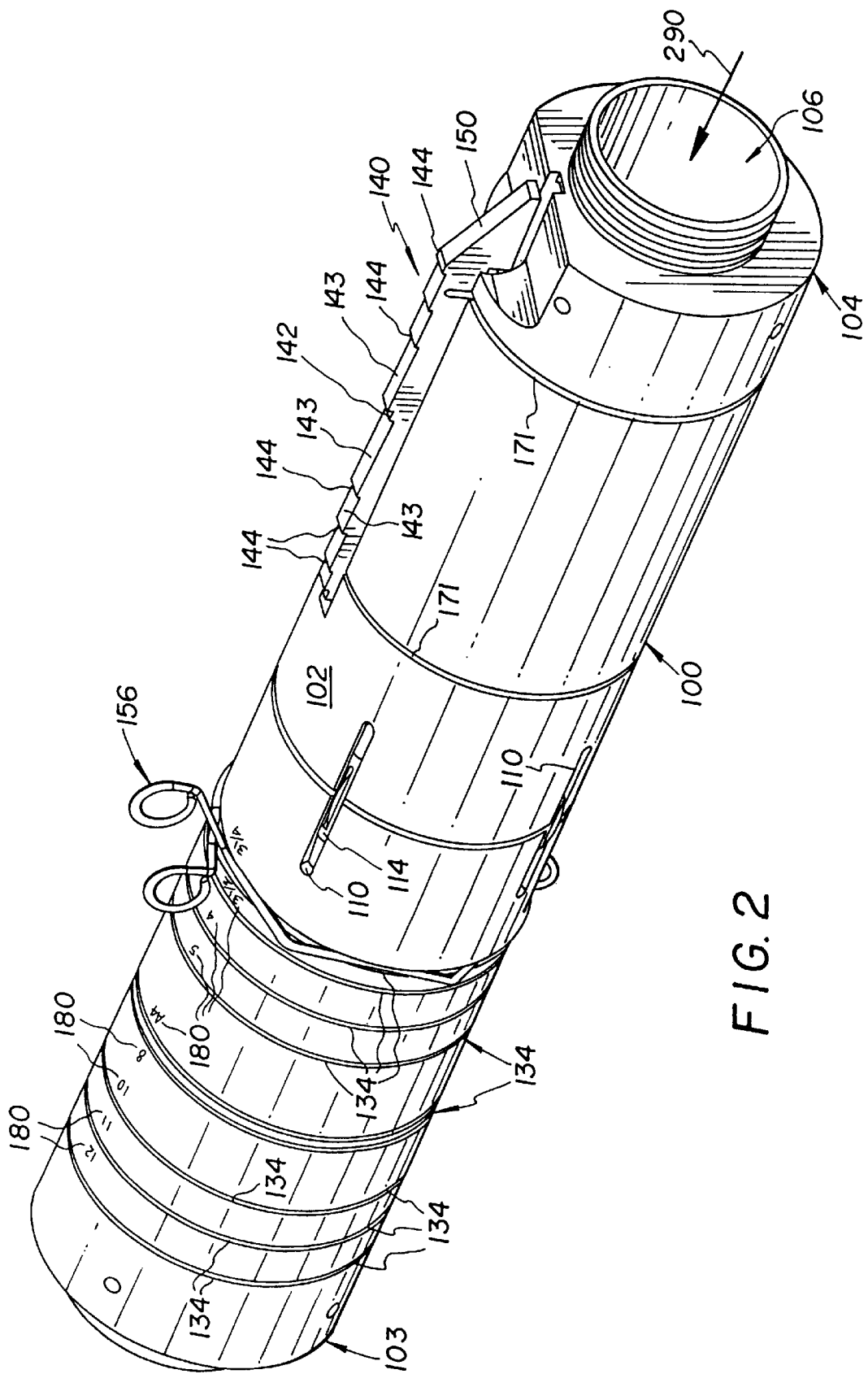
FIG. 2 is a perspective view of an intercore of the present invention.
Figure 5:
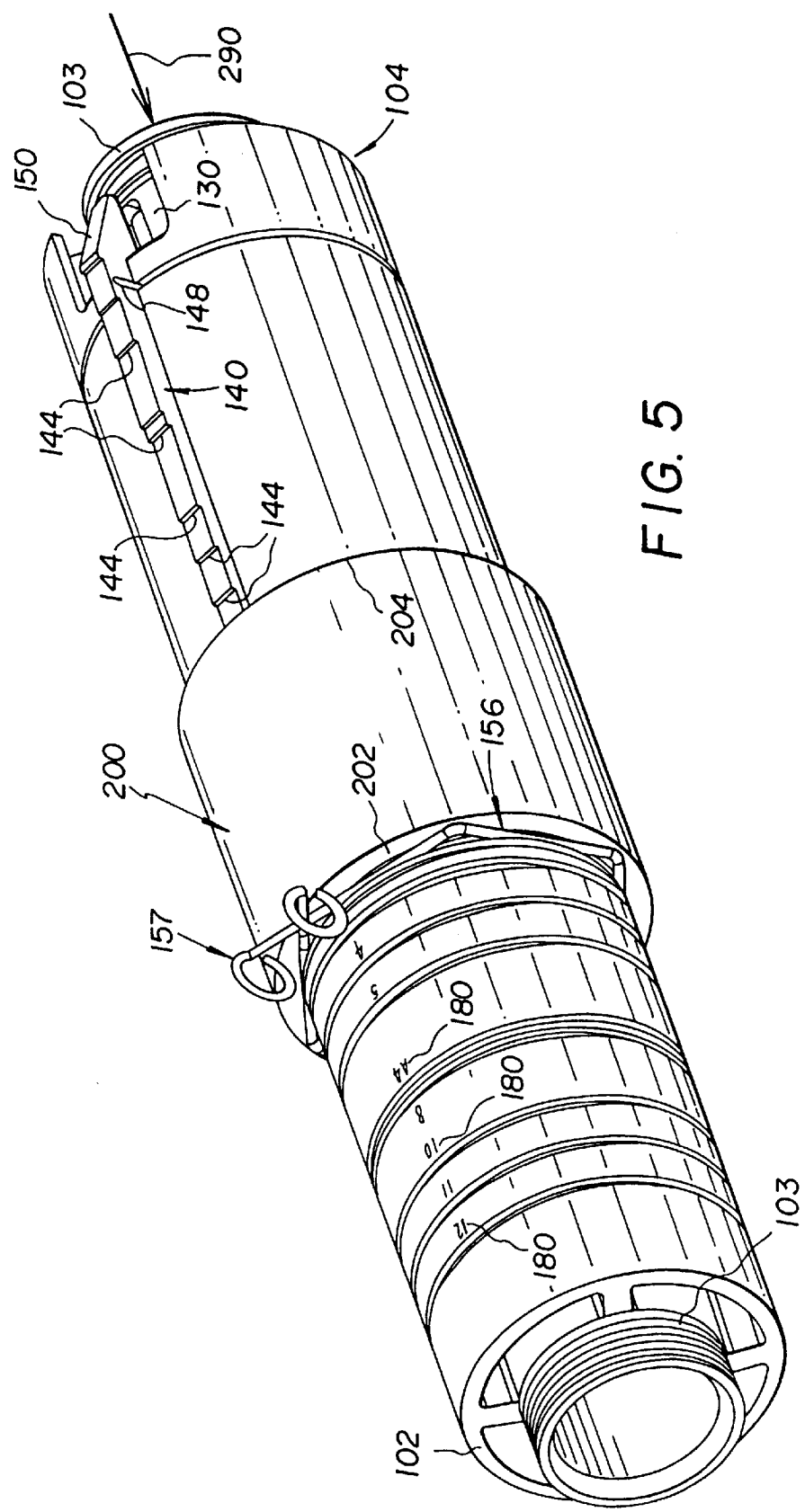
FIG. 5 is a perspective view of an intercore of FIG. 2 with a mounted paper roll core (the paper roll itself not being shown for clarity), ready to receive the spindle of FIG. 1.

The above components of intercore 100 assist in transmitting rotational torque from an inserted spindle 10, to a mounted core 200 (such as seen in FIG. 5), in a manner which will be described in more detail below. Intercore 100, also includes components which restrain axial movement of mounted cores of various widths, as will now be described. Specifically, intercore 100 has an elongated slot 128 extending part way along intercore 100, in particular along a rear portion 104 of intercore 100. An elongated ratchet 140 of rigid metal or plastic, is mounted within slot 128. Ratchet 140 includes an uppermost surface 142 (being "uppermost" in the sense that it is furthest outward from an axis of intercore 100) of a stairway configuration leading upward in a rearward direction to define a plurality of forward spacing, axially spaced apart, risers 144 (which act as forwardly facing stop members) which are separated by flat horizontal landings 143. Risers 144 are face forwardly at an angle of about 87 degrees to the axis of the intercore (although angles between about 45 to 90 degrees could optionally be used). This facilitates risers 144 gripping against a mounted core 200. The spacing of risers 144 accomodates cores 200 of different "widths" (in reference to a core, this means the dimension along the core axis). Note that risers 144 are not equally spaced. A lower surface of ratchet 140 has sideways extending slots 152, 154, each slot 152, 154 receiving a spring 160. Springs 160 urge ratchet 140 radially outward from a retracted position, in which all of the uppermost surface 142 lies at or below outer surface 102, to an extended position in which upper surface 142 is above outer surface 102 such as shown in FIG. 2. Ratchet 140 is restrained from moving radially outward beyond the extended position, by two open-ended retainer rings 170, 172, which are of the same construction as retainer ring 132. Retainer rings 170, 172 ride in respective grooves 171 on the rear half of intercore 100, while ring 170 also rides in a slot 146 (which is open only at an upper end) in ratchet 140, and ring 172 rides in a slot 148 (which is closed at both ends) in ratchet 140. Ratchet 140 functions to restrain a rearward end of a mounted core 200 from axial rearward movement.

To restrain a front end of a mounted core 200 from axial forward movement, intercore 100 is provided with a plurality of axially spaced grooves 134 extending around a forward half of intercore 100, which grooves act as ring guides. Each groove 134 can accommodate a resilient wire ring 156 of general hexagonal shape (although other polygonal shapes could less preferably be used), which includes a pair of finger grips 157 (FIG. 5). Each groove 134 is spaced about a middle of intercore 100 (the groove 131 being at the middle) symmetrically with a corresponding riser 144 of ratchet 140. In this manner, cores of various widths (with or without a photographic paper roll attached thereto) can be mounted on intercore 100, with each being retained in centered position on intercore 100. Paper width indicators 180 are printed on intercore 100 adjacent to respective grooves. Each of these paper width indicators 180 indicate to a user that when retainer ring 156 is positioned in the adjacent groove 134, a paper roll 210 (FIG. 7) of the indicated width can be mounted and will be restrained from axial forward or rearward movement.

The materials from which spindle 10 and intercore 100 are made, are not critical. However, rings 132, 156, 170, and 172, and springs 160, will typically be of suitable metal. Assembly of the components of intercore 100 will be readily understood from the above description. In particular, after lugs 114 have been positioned in their respective slots 110, resilient open ended retainer ring 132 can be forced open and passed through the slot 130 of each lug 114, and left resting in groove 131. Similarly, ratchet 140 can be pushed downward (that is, radially inward) against springs 160 and resilient retainer rings 170, 172 installed. It may be necessary to try a series of different positions of slots 152, 154 along the length of ratchet 140 to ensure that depression of rearward sloping rear portion 150 will push all risers 144 beneath surface 102, and that each riser 144 will prevent rearward movement of a mounted core 200. By "prevent" movement in this context is meant that movement cannot occur without destruction of core 200 or ratchet 140 or some other component of the intercore. The portion of spindle 10 forward of position 15 is preferably in the form of an outer plastic sleeve which is held by a bolt 17 onto an internal metal forward shaft portion. The interior of the plastic sleeve and shaft portion have approximately square cross sections to prevent rotation of the sleeve on the shaft. Such a configuration avoids costly machining of a metal shaft and reduces friction between the lugs 114 and slots 14. The plastic sleeve is a low friction lubricated type, such as LUBRICOMP (a composition of Nylon 66, 10% aramid, and PTFE), available from LNP Company, Pennsylvania, USA under product number RAL-4022HS, BK8115.

In operation, a cardboard core 200 carrying a photographic paper roll 210, is typically first mounted on intercore 100 in a darkroom. Prior to doing this, the width of the paper roll to be mounted is selected from those widths indicated by width indications 180. The user will compress finger grips 157 to release spring tension in retainer ring 156 and move ring 156 to the groove adjacent the corresponding selected paper roll width. Releasing finger grips 157 will allow retainer ring 156 to seat firmly within the selected groove 134. In the darkroom, the core 200, including attached photographic paper roll (not shown) of the previously selected width of paper, will be slid in a forward direction over intercore 100. Due to a rearward facing downwardly sloping rear portion 150 of upper surface 142 of ratchet 140, a front end 202 of core 200 will force ratchet 140 into its retracted position. Since ratchet 140 is now in its retracted position, core 200 will slip smoothly over intercore 100 until a front end 202 abuts core retainer ring 156 (specifically around each vertex 158). Retainer ring 156 is dimensioned so that when seated in a slot 134 the vertices 158 do not extend outward beyond core 200. This feature allows for some wandering of paper in an axial direction without interference from retainer ring 156. While core 200 is being moved in a forward direction, as a rear end 204 passes over each riser 144, ratchet 140 will pop outward slightly from its retracted position a distance equal to the height of the riser 144. When front end 202 of core 200 comes to rest against ring 156 in a mounted position of core 200, rear end 204 should have just passed over a corresponding riser 144. Thus, in such mounted position, core 200 is restrained from rearward axial movement by abutting against a forwardly facing vertical riser 144, and is restrained from forward axial movement by abutting against ring 156.

Note that as core 200 is being pushed forwardly on intercore 100, lugs 114 are readily pushed into their retracted positions (if they are not already in such positions) since there is nothing urging them outward toward their extended positions. Furthermore, chamfered corners 127 and curved blade 118 of lugs 114, facilitate smooth travel of core 200 over lugs 114. The outwardly convex shape of blade 118 and the slope of upper margin 116 away from a peak defined by the highest point of blade 118, further facilitate such smooth travel.

Figure 6:
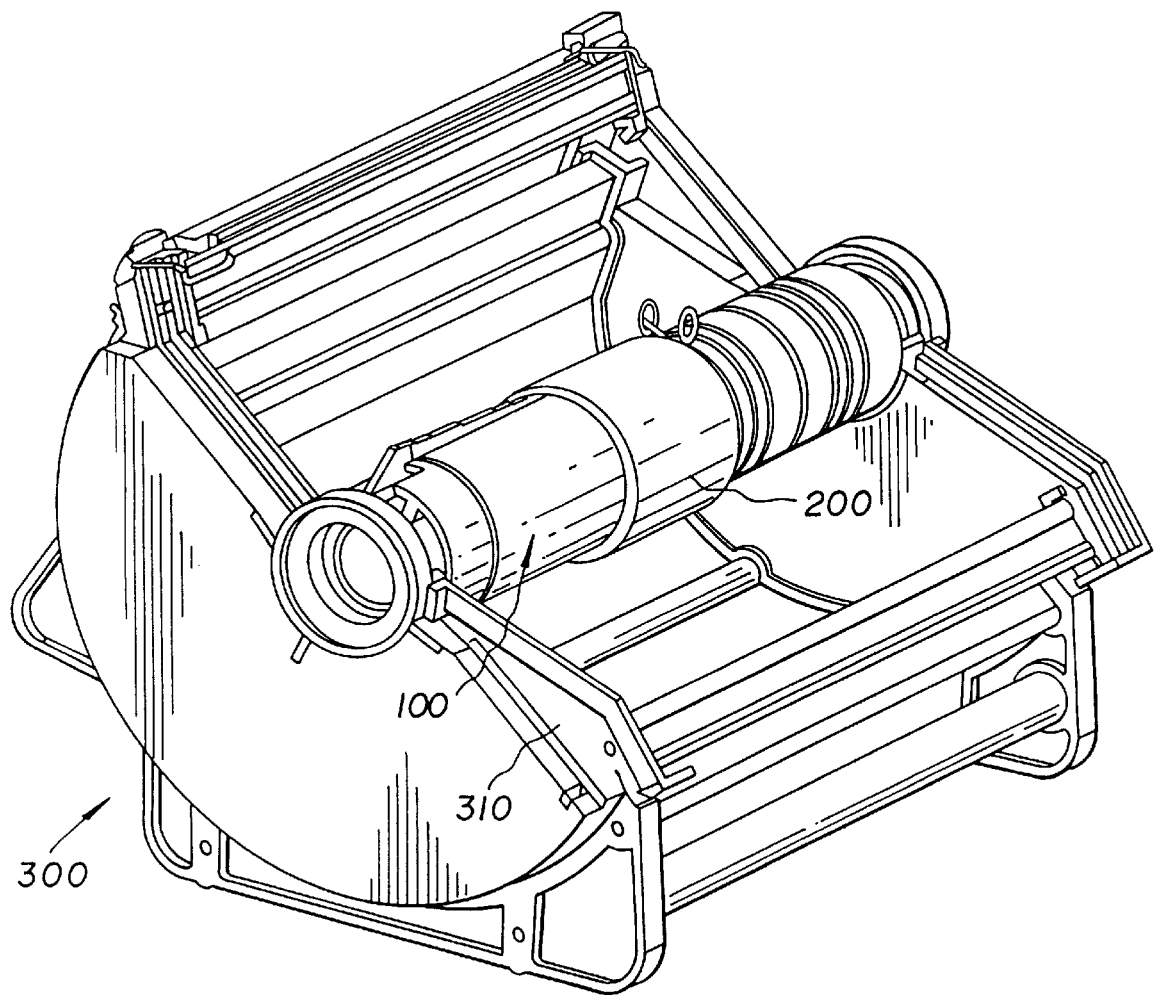
FIG. 6 is a perspective view of an open paper cassette with a mounted intercore and core assembly (the paper roll not being shown for clarity), ready to receive the spindle of FIG. 1.

After mounting of a core 200 with attached photographic paper roll 210 in the above manner, intercore 100 with mounted core and paper roll, can then be positioned in a cassette 300 as shown in FIG. 6 with ends 103 and 104 resting in corresponding ends of cassette 300 to define light locks. Cassette 300 may be of the construction disclosed in U.S. patent application entitled "CASSETTE FOR PHOTOSENSITIVE MATERIAL", Ser. No. 09/014,803 filed by Entz on Jan. 28, 1998. That reference and all other references cited here, are incorporated in this application by reference. Lid 310 of cassette can then be closed and the now loaded cassette transported to a printer (now shown) where the photographic paper will be exposed to a series of images. Either at the printer or before, spindle 10 can have front end 12 inserted into a rear end of bore 106 of intercore 100, in a forward direction (illustrated by arrow 290 in FIGS. 5 and 7). This insertion actually takes place by moving closed cassette 300 onto stationary spindle 10. Note that this insertion is "blind", in the sense that the initial relative rotational positions of the intercore 100 and spindle 10 are irrelevant. During such insertion, rearwardly converging forward sections 32 of each set of opposing walls 30 will ensure that a corresponding one of lugs 114 is guided into one of slots 14. Spindle 10 may rotate as may be necessary when spindle 10 is being inserted into intercore bore 106 until all four lugs 114 have entered respective slots 14.

Continued forward insertion of spindle 10 will result in bottom margins 124 of lugs 114 riding up on sloping portion 20 of respective ramps 16. This will urge lugs 114 outward within slots 110 from their retracted to extended positions, until bottom margins 124 are positioned in flat portions 22 of respective slots 14 when intercore 100 is in its mounted position on spindle 10. At this point each blade portion 118 has dug firmly into cardboard core 200 to restrain rotational movement of core 200 relative to intercore 100. Further, opposing walls 30 of each slot 14 restrain rotational movement of lugs 114 and thus intercore 100 relative to spindle 10. Thus, rotation of spindle 10 positively rotates intercore 100 without rotational slippage of one relative to the other. In sum then, rotation of spindle 10 will be positively transmitted to intercore 100. When spindle 10 is fully inserted into intercore 100, this corresponds to a mounted position of the cassette in the printer. Cassette 300 is held in its mounted position within the printer, by suitable restraints (not shown).

When the paper roll loaded within cassette 300 is exhausted, or needs to be changed for any reason, the above described procedure is simply reversed. That is, spindle 10 can be removed from intercore 100 by pulling cassette 300 off spindle 10. Cassette 300 is then typically transported to a darkroom where it is opened, and intercore 100 and mounted empty core 200 removed from cassette 300. At this point, blades 118 are no longer being urged into core 200 (since spindle 10 has already been removed). Sloping rear portion 150 of ratchet 140 can then be pressed by a user to force ratchet 140 axially downward into its retracted position. Core 200 can now simply be slid rearwardly off intercore 100. A new core (with attached photographic paper roll) can then be mounted on intercore 100 if desired (following adjustment of ring 156 to another groove 134 if a different width paper roll core is to be mounted).

Figure 7:
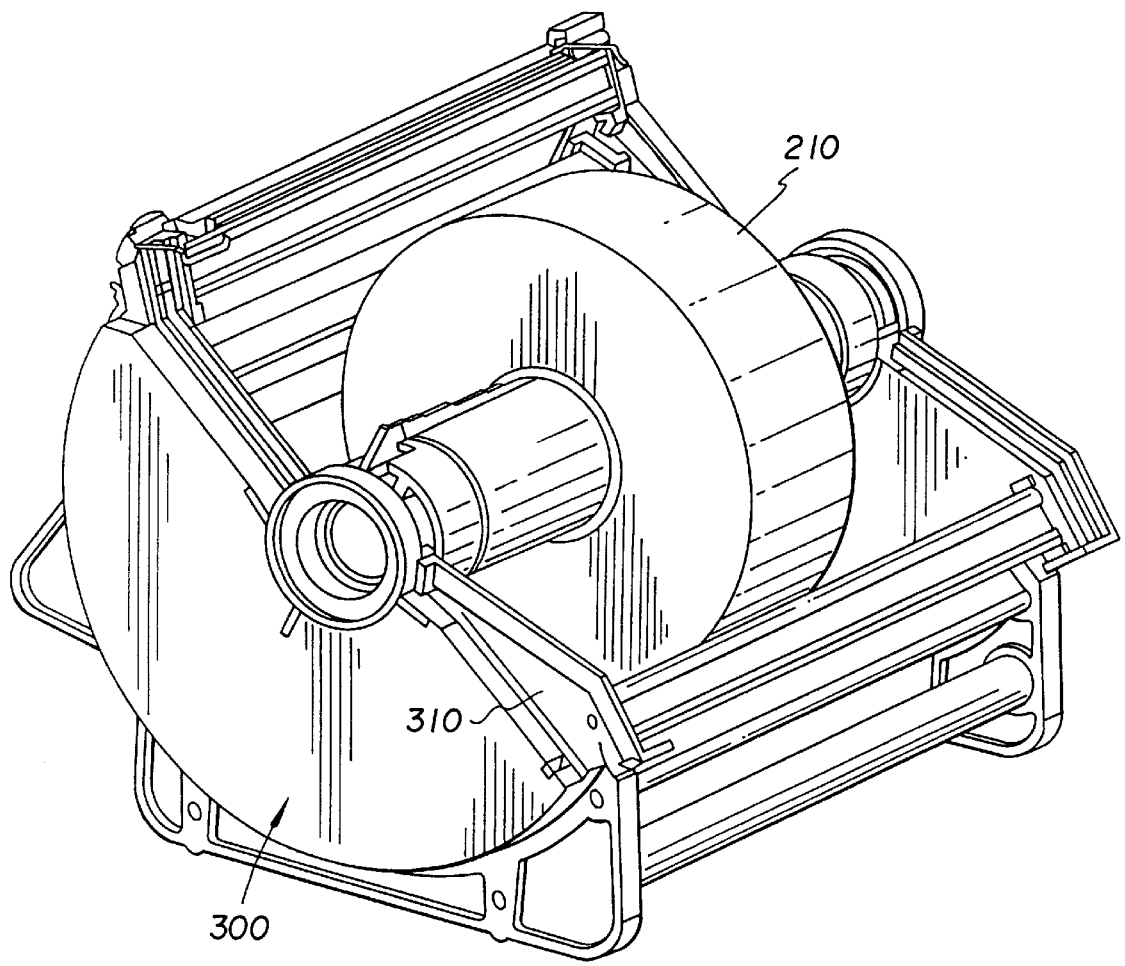
FIG. 7 is a view similar to FIG. 7 but showing the paper roll being present, as is normally the case when the cassette is used to dispense unexposed photographic paper.
Figure 8:
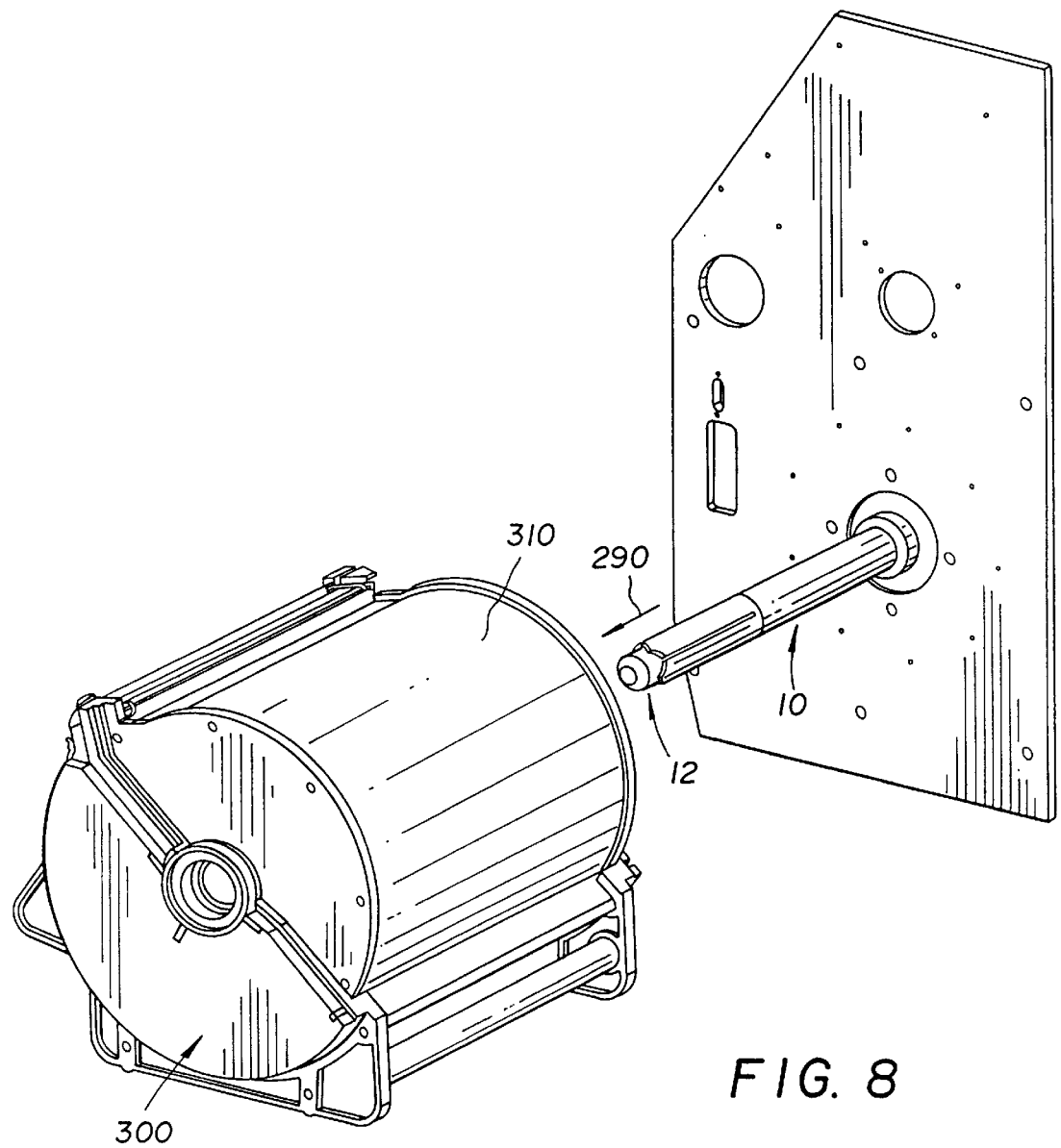
FIG. 8 is a view similar to FIG. 7 but showing the cassette in a closed position ready for mounting on a spindle.

A cassette 300 which has received an intercore 100 with mounted core 200 having no attached photographic paper roll (such as shown in FIG. 6) could be used as a paper take-up cassette to receive exposed photographic paper in the printer. Such a cassette may be first positioned in the printer with a spindle 10 inserted into intercore 100, and an end of the photographic paper web attached to mounted core 200 by known means. In this case spindle 10 would be rotated in a direction to cause take up of the photographic paper web onto previously empty core 200 to form a roll of photographic paper exposed with images. When all of a roll 210 has been wound onto the previously empty core 200, the closed cassette 300 can be transferred to a developer for chemically developing the exposed images on the photographic paper. Of course, the photographic paper web may be any one of a number of different widths dispensed by a cassette with a mounted core and attached photographic paper roll 210 (such as shown in FIG. 7).

It will be appreciated that the intercore 100 could be used without the ratchet 140 arrangement, the core 200 being restrained axially when mounted by fixed position flanges in a known manner (in which case different intercores may again be needed for different width intercores). However, the benefit of positive rotational gripping of core 200 will still be obtained. Alternatively, the ratchet 140 arrangement could be used without the lug 114 arrangement on the intercore (and without slots 14 on spindle 10). In this case the benefit of positive rotational gripping of core 200 will be lost with only conventional friction being relied upon between core 200 and intercore 100 (with the accompanying difficulties in mounting core 200 on intercore 100 in a dark room). However, the benefit of mounting different width cores on the same intercore could still be obtained. Preferably though, the ratchet 140 arrangement and the lug 114 and slot 14 arrangement are all used together, to obtain the advantages provided by each.

The invention has been described in detail with particular reference to certain preferred embodiments thereof, but it will be understood that variations and modifications can be effected within the spirit and scope of the invention.

PARTS LIST 10 spindle
11 axis
12 front end
13 rear end
14 slots
16 ramps
18 forward portion
20 outwardly sloping portion
22 rearward portion
30 opposing walls
31 rearward sections
32 forward sections
100 intercore
102 outer surface
103 front end
104 rear end
106 bore
110 slots
114 lugs
116 upper margin
118 convex blade portion
119 main body portion
120 straight front margin
122 straight rear margin
124 straight bottom margin
126,127 corners
128 elongated slot
130 slot
131 groove
132 retainer rings
134 grooves
140 ratchet
142 uppermost surface
143 landings
144 risers
146,148 slot
150 rear portion
152,154 slots
156 ring
157 finger grips
158 vertex
160 spring
170,172 retainer ring
171 grooves
180 paper width indications
200 cardboard cores
210 paper roll
202 front end
204 rear end
300 cassette
310 lid

What is claimed is:

1. An elongated spindle for insertion into a bore of an intercore which mounts a hollow photographic web roll core for rotation, the elongated spindle comprising:
    (a) a front end;
    (b) a rear end adapted to be rotationally driven;
    (c) one or more axially extending ramps which slope radially outwardly in a direction away from the front end; and
    (d) opposing walls extending alongside each ramp, wherein forward sections of the opposing walls of a corresponding ramp converge in a direction toward the rear end of the spindle, so as to guide lugs mounted on the intercore onto the ramps during insertion of the spindle into the intercore, and rearward sections of the opposing walls are essentially parallel to restrain rotational movement of the lugs received therewithin when the spindle is in a fully inserted position within the bore of the intercore.

2. A drive assembly for mounting and rotating a hollow photographic web roll core, the drive assembly comprising:
    (a) an elongated spindle having:
        (i) a front end;
        (ii) a rear end adapted to be rotationally driven;
        (iii) one or more axially extending ramps which slope radially outward in a direction away from the front end; and
        (iv) opposing walls that extend alongside each ramp;
    (b) an intercore for insertion into the web roll core, and having:
        (i) a bore to removably receive the spindle by insertion of the spindle front end into the bore; and
        (ii) at least one slot carrying a lug which can move radially within the slot and which is positioned such that insertion of the spindle front end into the bore causes said lug to ride on a corresponding ramp and be urged radially outward through the slot and into engagement with a hollow core positioned over the intercore;
    wherein forward sections of the opposing walls of a corresponding ramp converge in a direction toward the rear end of the spindle, so as to guide lugs mounted on the intercore onto the ramp during insertion of the spindle into the intercore, and rearward sections of the opposing walls are essentially parallel to restrain rotational movement of the lugs received therewithin when the spindle is in a fully inserted position within the bore of the intercore.

3. A drive assembly according to claim 2 wherein there are a plurality of said lugs and a plurality of said slots carrying respective lugs, spaced radially around the intercore.

4. A drive assembly according to claim 3 additionally comprising a lug retainer extending around the intercore and interconnecting the lugs, to limit radial outward movement of the lugs.

5. A drive assembly according to claim 4 wherein the lug retainer is a resilient wire member.

6. A drive assembly according to claim 5 wherein each lug has a radially extending slot within which the lug retainer rides.

7. A drive assembly according to claim 2 wherein each lug and slot is axially elongated, with straight bottom, front and rear edges, and with chamfered corners interconnecting the bottom edges to the front and rear edges and interconnecting the front and rear edges to an outermost edge.

8. An intercore according to claim 2, wherein said lug comprises a top surface having first and second curved corners and an upper margin which extends between said first and second curved corners, said upper margin having a first end portion adjacent to said first curved corner which upwardly slopes from said first curved corner and a second end portion adjacent to said second curved corner which upwardly slopes from said second curved corner.

9. An intercore according to claim 8, wherein said upper margin comprises a center portion located between said first and second end portions and a radially outwardly convex blade portion which extends from said center portion.

10. An intercore according to claim 9, wherein said blade portion digs into said hollow core when said lug comes into engagement with said hollow core.

11. An intercore according to claim 2, wherein said intercore is an elongated tubular intercore.

12. A drive assembly according to claim 2 wherein each lug and slot is axially elongated, with each lug having an axially elongated radially outermost blade portion of variable height along a length of the lug and which peaks at a position intermediate a front end and a rear end of the blade portion.

13. A drive assembly according to claim 12 wherein each blade portion peaks at a position mid-way along a length of the blade portion.

14. A drive assembly according to claim 12 wherein the blade portion is outwardly convex along a length of the blade portion.

15. A drive assembly according to claim 14 wherein each blade portion is thinner in a radial direction than a main portion of the lug.

\* \* \* \* \*